United States Patent [19]
Wagner et al.

[11] Patent Number: 5,699,445
[45] Date of Patent: Dec. 16, 1997

[54] METHOD FOR RECORDING COMPRESSED DATA

[75] Inventors: Samuel J. Wagner, Lilburn, Ga.; Brent D. Taft, New Concord, Ohio

[73] Assignee: Paul W. Martin, Dayton, Ohio

[21] Appl. No.: 866,613

[22] Filed: Apr. 10, 1992

[51] Int. Cl.$^6$ ........................................................ G06K 9/36
[52] U.S. Cl. .................................................. 382/119; 382/232
[58] Field of Search .................................. 382/3, 13, 56, 382/187, 119, 241, 243, 232; 340/705–707; 345/179, 180

[56] References Cited

U.S. PATENT DOCUMENTS

| | | | |
|---|---|---|---|
| 4,513,444 | 4/1985 | Okai et al. | 382/56 |
| 4,542,412 | 9/1985 | Fuse et al. | 382/13 |
| 4,550,438 | 10/1985 | Convis et al. | 382/56 |
| 4,758,979 | 7/1988 | Chiao-Yueh | 382/13 |
| 4,817,034 | 3/1989 | Hardin, Sr. et al. | 382/13 |
| 4,969,201 | 11/1990 | Tokasaki et al. | 382/22 |

*Primary Examiner*—Leo Boudreau
*Assistant Examiner*—Chris Kelley
*Attorney, Agent, or Firm*—Paul W. Martin

[57] ABSTRACT

A method for recording compressed data which includes a perpendicular test as well as a parallel test for discarding handwritten data points relative to a series of guide lines. The parallel test determines whether a data point lies at a true distance within a predetermined threshold distance either side of the guide line. The perpendicular test determines whether the data point lies between two perpendicular lines through the end points of the guideline. Both tests must be satisfied before a data point is discarded. To save memory space, the guidelines are defined by an endpoint and a delta value. Error is maintained at a predetermined limit by adjusting the delta values prior to storage.

1 Claim, 15 Drawing Sheets

METHOD FOR RECORDING COMPRESSED DATA

CROSS-REFERENCE TO RELATED APPLICATION

The present invention is related to commonly-assigned U.S. patent application Ser. No. 693,822, now U.S. Pat. No. 5,285,506 entitled "Method of Recording a Handwritten Signature", invented by Crooks et al.

BACKGROUND OF THE INVENTION

This invention relates to data compression and packing of a handwritten message such as a signature in digitized form, and specifically to a method for recording compressed data.

The method of the present invention has particular application in conjunction with the method disclosed in the co-pending application by Crooks et al., in which a handwritten signature is captured at a point of sale, compressed, and stored for later use to authenticate the transaction. Strokewise data compression is accomplished by examining the coordinate data on a sequential basis in accordance with the ordered storage arrangement thereof. A digital computing device progressively selects start points and stop points and examines the coordinates of all midpoints situated therebetween, where midpoints are defined as points located in time between the start and stop points. The computing device establishes guidelines between the start points and their associated stop points and selectively saves the coordinate data only for those midpoints which are not situated at predetermined locations relative to their associated guidelines. Midpoints which are situated at predetermined locations are considered to be redundant and are discarded.

The preferred method disclosed by Crooks et al. for saving and discarding data is a linear fit criterion. A straight line is established between each start point and the successively established stop points. The equation of the straight line between the start point and the stop point is calculated in terms of a slope and a Y-intercept. For each examined midpoint, the X coordinate thereof is substituted into the equation for the line, and the line equation is solved to determine a Y value. The calculation is performed using floating point arithmetic, and the result is converted to an integer. If the resulting integer value of Y is equal to the Y coordinate of the point being examined, based upon the amount of scaling provided, then the rejection criterion is satisfied. The scaling factor represents a desired reduction in resolution for the resulting data and provides an inherent threshold for accepting or rejecting midpoints.

Crooks et al. disclose an alternative embodiment which utilizes a rejection criterion which is based upon a calculated perpendicular distance between a midpoint under examination and a straight line between the start point and the stop point. The calculated distance is compared with a predetermined threshold distance to either accept or reject the midpoint.

Merchandising systems used in conjunction with the method described in the above-mentioned patent application are equipped with a transparent glass screen having a resistive coating fused to its surface. A linearized voltage field is established on the surface of the screen. A human signature is captured by providing a hand-held stylus which is moved across the surface of the screen during writing of the signature. A digitizer senses the position of the stylus during writing of the signature and generates digital signals representing the X-Y coordinates of the stylus. The digitized coordinates are stored in a memory and are also used to drive a liquid crystal display positioned below the glass screen. This produces a visual display of the signature, as the handwriting progresses. Means are provided for maintaining the signature in registration with the movement of the stylus.

While the compression method disclosed in the co-pending application works well, use of the method can result in the loss of extreme data points. In addition, the method is heuristic. Therefore, it would be desirable to provide an improved linear fit compression method which uses real arithmetic. It would also be desirable to provide an improved recording process which would includes storing and retrieving the handwriting data from a storage medium having a capacity limited to about one-hundred bytes, without significant loss of accuracy.

SUMMARY OF THE INVENTION

Thus, in accordance with the teachings of the present invention, a method for recording compressed data is provided. The method includes a perpendicular test as well as a parallel test for discarding handwritten data points relative to a series of guide lines. The parallel test determines whether a data point lies at a true distance within a predetermined threshold distance either side of the guide line. The perpendicular test determines whether the data point lies between two perpendicular lines through the end points of the guideline. Both tests must be satisfied before a data point is discarded. To save memory space, the guideline is defined by an endpoint and a delta value. Error is maintained at a predetermined limit by adjusting the delta values prior to storage.

It is therefore an object of the invention to provide an improved method of recording handwritten signature information in digital form.

It is another object of the invention to provide an improved method of compressing data representing a handwritten signature.

It is another object of the present invention to provide an improved method for storing compressed data.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DESCRIPTION OF THE PREFERRED EMBODIMENT

Figure 1:
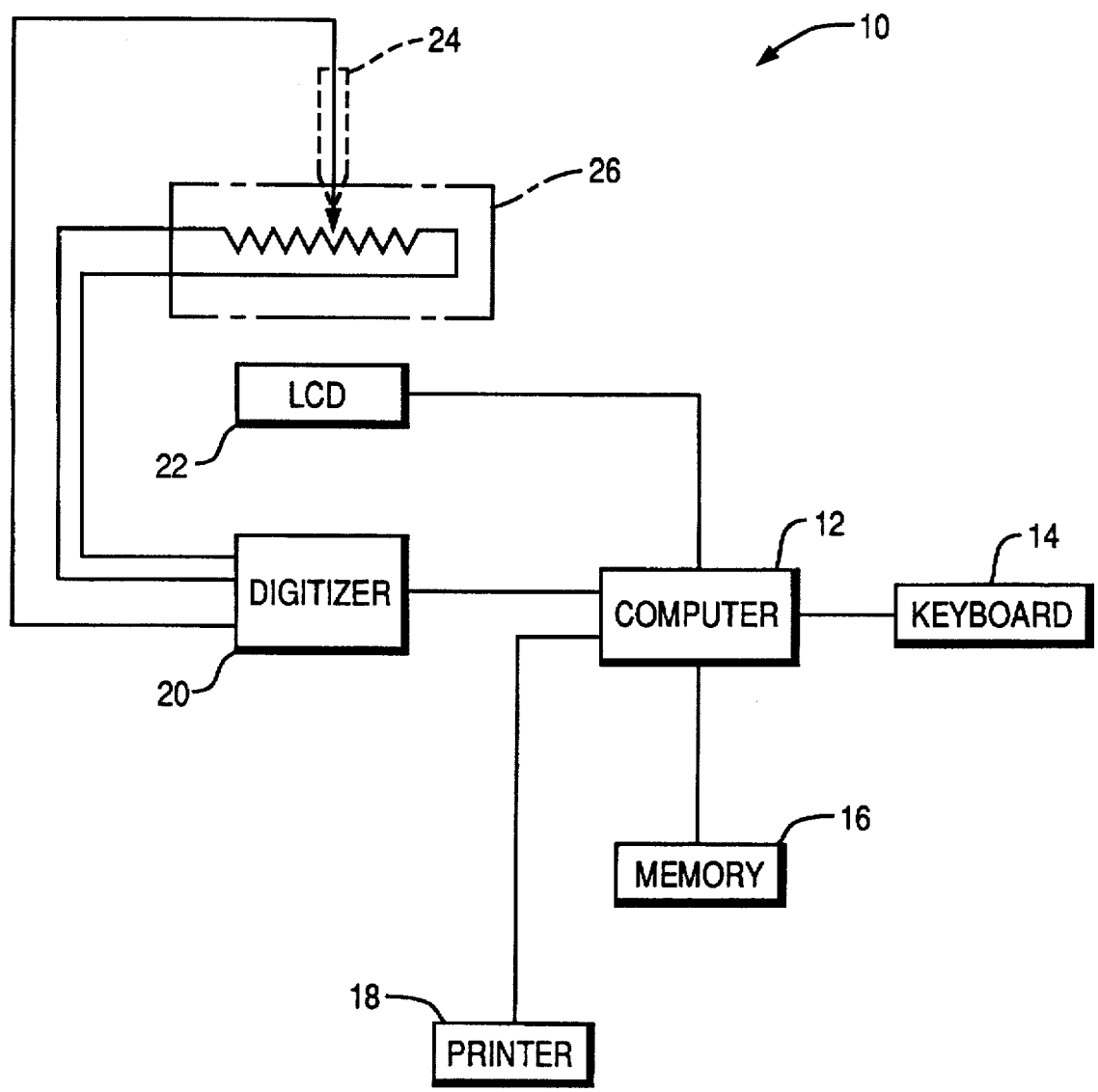
FIG. 1 is a block diagram of a signature recording system.

Referring now to FIG. 1, the method of the present invention is particularly suited for use with point-of-sale system 10, which includes computer 12, keyboard 14, memory 16, printer 18, digitizer 20, liquid crystal display (LCD) 22, and stylus 24.

In the preferred embodiment of the invention digitizer 20 is a Scriptel RDT Sillo-ette™ Model 1212. Digitizer 20 captures stylus positional information for a series of discrete points at regularly timed intervals. These time intervals are short enough to capture a high-quality record of a fast-moving handwritten input. A digitizer of the above mentioned type is capable of capturing a rapidly written signature at a resolution of 1,000 dots per inch (dpi). However, a resolution of only about 75 dpi is satisfactory for many signature recording requirements, and therefore the system may generate redundant data. The amount of such redundant data will be increased if the handwriting proceeds at a slow pace.

The serial data generated by a digitizer of the above-mentioned type is organized into 7-byte messages, each representing a single position/status report for the stylus.

Digitizer 20 includes glass screen 26. A resistive coating is fused upon the surface of glass screen 26 and a linearized voltage field is applied thereto. Digitizer 20 senses the position of the stylus tip relative to screen 26 and generates a corresponding sequence of digital data bytes. These data bytes carry the 8-bit binary codes representing the X-Y coordinates for a series of sequentially-written signature points; each signature point being displaced from its neighbors along a line running in the strokewise direction (i.e., in the direction of the path traveled by the stylus).

Stylus 24 may be grasped by a human participant and brought into contact with glass screen 26. Stylus 24 is held in contact with glass screen 26 while the human participant makes a handwritten signature.

LCD 22 is positioned below the surface of digitizer screen 26. Screen 26 is transparent, so that a display presented by LCD 22 may be observed therethrough. Positional coordinate information from digitizer 20 is applied to LCD 22 for creating a visual image of the progressively written signature. The signature coordinate information is also stored in a suitable digital memory 16 for further processing as described in detail below, where:

- X0–X15 form the x-position coordinate value. X15 is the most significant bit, while X0 is the least significant bit.
- Y0–Y15 form the y-position coordinate value. Y15 is the most significant bit, while Y0 is the least significant bit.
- SGN is the sign of the value which follows. SGN=0 indicates a positive value while SGN=1 indicates a negative value.
- PA is a flag bit which indicates what type of input device is being used with the digitizer (puck, stylus, etc.). It is equal to 0 when a stylus is being used.
- PB2, PB4, and PB8 are not used for the stylus input device.
- PB1 indicates the state of the stylus tip switch. When the stylus is pressed against the digitizer tablet, PB1=1. When the stylus is not pressed against the digitizer tablet, PB1=0.
- ST1 and ST2 are proximity flags. When the stylus is close enough to the digitizer pad to sense stylus position, ST1=ST2=0. When the stylus is too far away from the pad to sense stylus position, ST1=ST2=1.

Computer 12 receives stylus position and status information via a serial RS232 link. Computer 12 may be an NCR PC810 personal computer, but other personal computers may be used. Computer 12 generates image control signals for LCD 22 and print control signals for printer 18.

Keyboard 14 supplies transaction information to computer 12.

Memory 16 provides a storage medium for signature data which remains after redundant signature data is discarded.

Figure 2A:
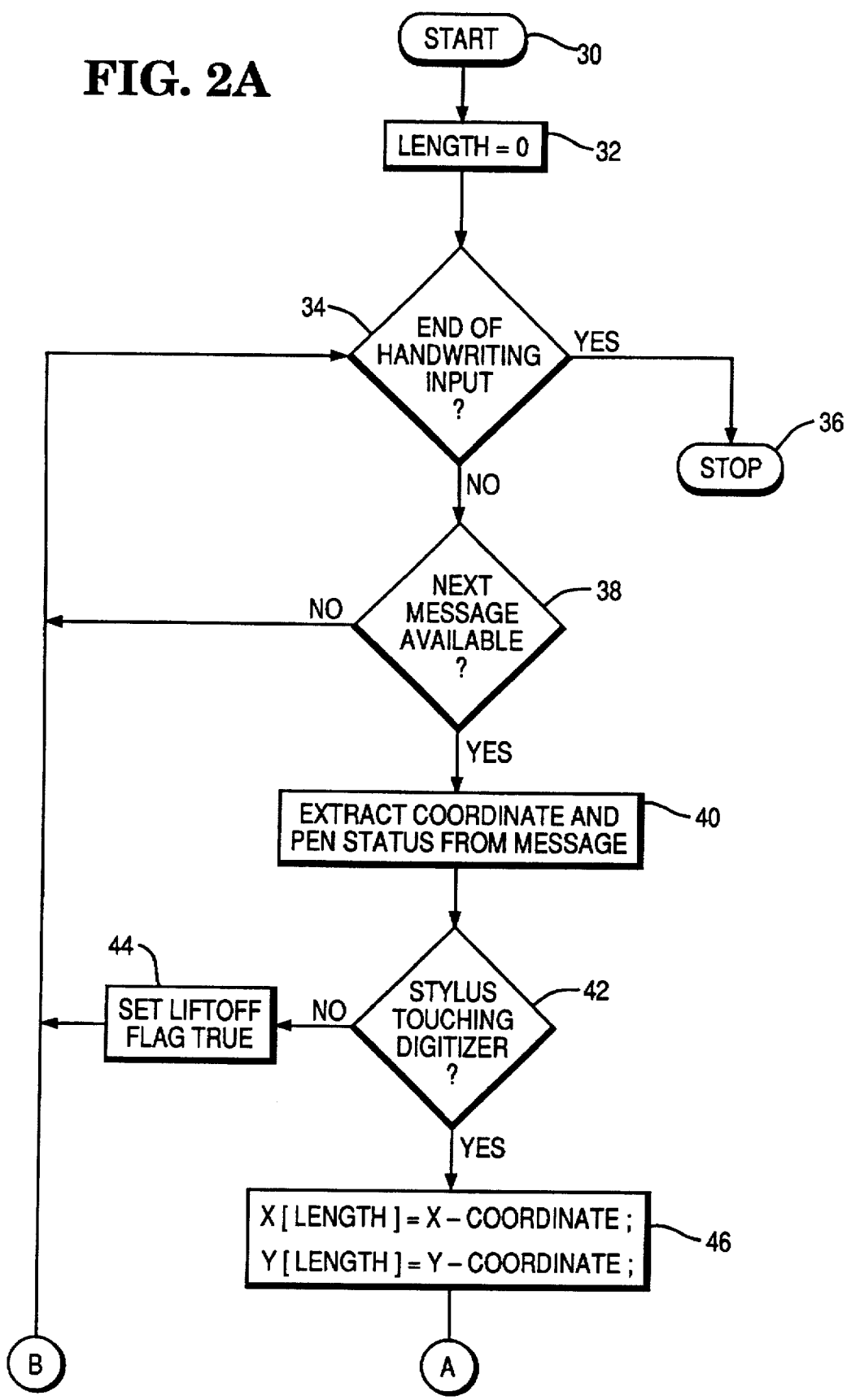
FIGS. 2A and 2B are a flowchart of a digital computer routine for capturing positional coordinates for a handwritten signature.
Figure 2B:
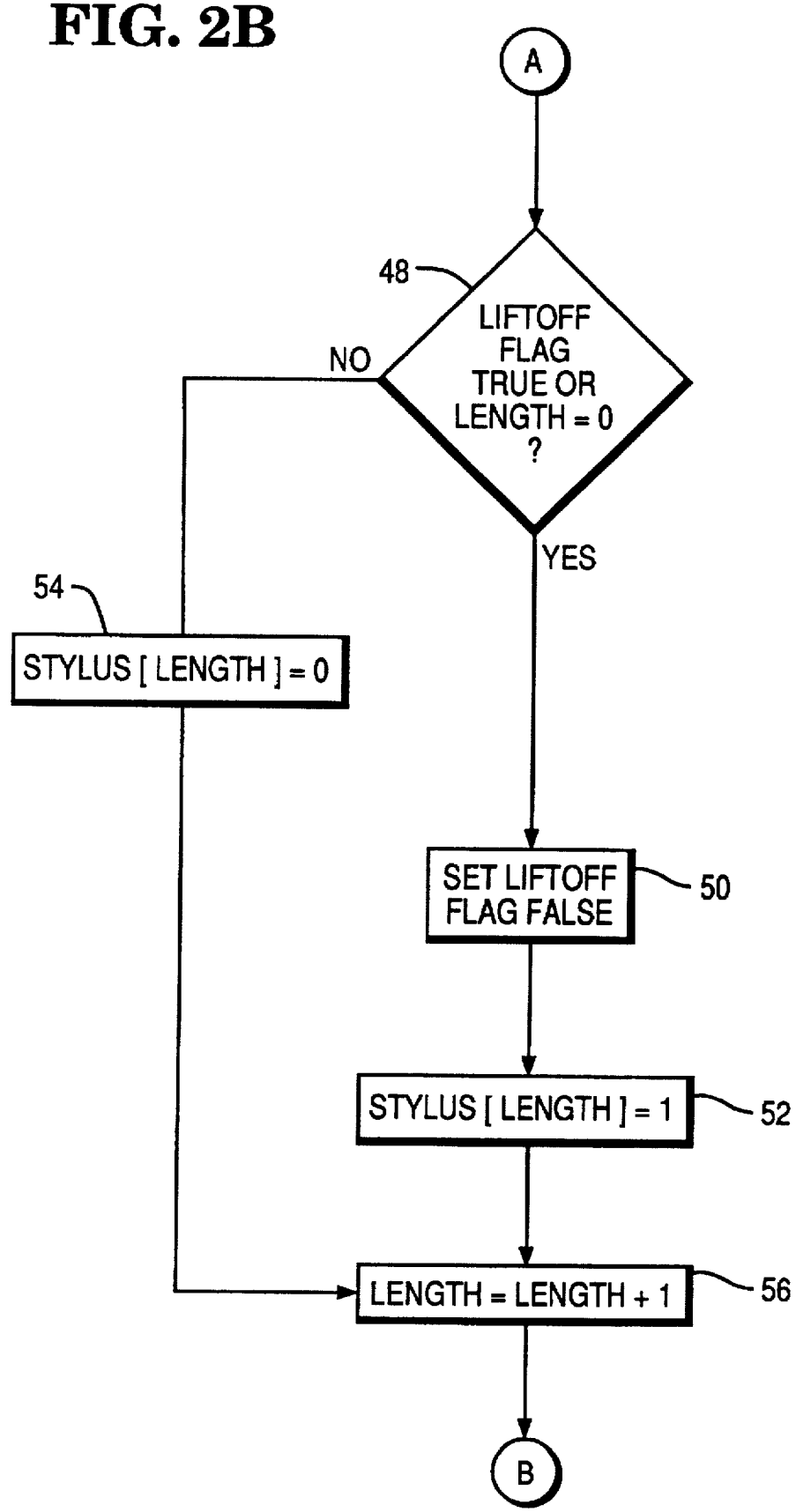

As shown in FIGS. 2A and 2B, the X-Y coordinates of the signature points may be captured using the method disclosed by Crooks et al. Such a method may store the digitizer data in three arrays as follows:

(1) "x[n]", which is the horizontal position or x-coordinate of a data point.

(2) "y[n]", which is the vertical position or y-coordinate of a data point.

(3) "stylus[n]", which provides stroke information. "stylus[n]=0 indicates that point n is part of a continuing stroke; that is, the stylus was in contact with the digitizer surface at point n−1. "stylus[n]=1 indicates that point n is at the beginning of a new stroke.

The value of the variable n begins at 0 and is incremented for each new data point. The program uses an integer known as "length" which has an initial value of 0 and which progressively increases until it reaches a value equal to the highest value of n plus 1. Thus, "length" takes on a value equal to the total number of data points. Each of the above-mentioned arrays contains data for "length" points after completion of the sequence illustrated in FIGS. 2A and 2B. It is common programming practice to assign the value 0 to the first element of an array, so the index value for the last element of each array is equal to length−1.

Referring again to the flowchart of FIGS. 2A and 2B, execution starts at block 30 and then continues to block 32 where the variable "length" is initialized at a value of 0. This value is incremented as each new data point is read.

In block 34, the program performs a keyboard scan to detect a keystroke indicating that the handwritten input is complete. If the input is complete, then the program exits to point 36. The value of "length" at that point in time is stored in memory as a constant.

If the handwriting input is not complete, then the program progresses to block 38 to determine whether the next message is available. If a complete message is not yet available, execution proceeds back to block 34 until a message is available.

If the next message is available, the program continues to block 40 where x and y coordinates, as well as stylus status information, are extracted from the complete message via conventional bit manipulation. Reference may be made to Table I for guidance in the preparation of an appropriate bit manipulation routine:

TABLE I

| Byte | bit 7 | bit 6 | bit 5 | bit 4 | bit 3 | bit 2 | bit 1 | bit 0 |
|------|-------|-------|-------|-------|-------|-------|-------|-------|
| 1 | 1 | ST1 | ST2 | PA | PB8 | PB4 | PB2 | PB1 |
| 2 | 0 | 0 | 0 | 0 | 0 | SGN | X15 | X14 |
| 3 | 0 | X13 | X12 | X11 | X10 | X9 | X8 | X7 |
| 4 | 0 | X6 | X5 | X4 | X3 | X2 | X1 | X0 |
| 5 | 0 | 0 | 0 | 0 | 0 | SGN | Y15 | Y14 |
| 6 | 0 | Y13 | Y12 | Y11 | Y10 | Y9 | Y8 | Y7 |
| 7 | 0 | Y6 | Y5 | Y4 | Y3 | Y2 | Y1 | Y0 |

Following extraction of coordinate data and stylus status information from the message, the program continues to block 42 where the BP1 bit of the current message is examined to determine whether the stylus is pressed against the digitizer tablet. If not, a flag known as the liftoff flag is set "true" in block 44 and the program returns to block 34.

If the stylus is found to be touching the digitizer, then execution proceeds to block 46, where the x and y coordinate values are stored in the x and y arrays at index locations indicated by the current value of "length".

In block 48, an inquiry is made to determine whether the liftoff flag is set to a logical "true" OR if "length" is equal to 0. If either condition is true, execution continues to block 50, where the liftoff flag is set to a logical "false". Execution continues to block 52, where a "1" is stored in the "stylus[]" array at position "length".

If neither the liftoff flag is set to a logical "true" nor is "length" equal to 0, then "stylus[length]" is set equal to 0 in block 54. Then, in block 56, "length" is incremented. Finally, execution returns to block 34.

After completing the procedure illustrated by the flowchart of FIGS. 2A and 2B, the method of Crooks et al. continues by compressing the data stored in arrays x[n], y[n] and stylus[n]. Compression proceeds on a strokewise basis, so that the data stored in the above-noted arrays is examined in the order in which it was stored. It will be appreciated that the stored data files may be examined in a reversed order or on a piecewise basis, either of which are equivalent to examination from beginning to end. All such equivalent examination sequences are referred to herein by the term "strokewise".

Compression involves two general phases, the first of which is a scaling phase. In this connection the program uses a variable "old_res" to refer to the resolution of the data as initially captured. Thus each count in x[n] and y[n] represents a distance of 1/old_res from the origin. The location of the origin is unimportant so long as all points are specified with reference to the same origin. A common point for the origin is the center of the digitizer panel, and old_res is determined by the digitizer pad used. For example, if the digitizer has a resolution of 1,000 dpi, each count in x[n] and y[n] initially represents a distance of 0.001 inches. A value of x[n] equal 500 therefore represents a horizontal distance of 0.5 inches from the origin, and a value of 250 for y[n] represents a vertical distance of 0.25 inches from the origin.

Referring now to FIGS. 3A through 3E, the compression procedure is shown. Variables used in this procedure are as follows:

1. "x[]" and "y[]" are arrays of length "length" which contain the horizontal and vertical coordinates respectively of each point in the handwriting record, as described previously. After compression, these arrays contain the horizontal and vertical coordinates of the compressed handwriting record.
2. "stylus[]" is an array of length "length" which contains the action of the stylus at the point specified by x[n] and y[n], as described previously. After compression, this array contains the stylus action for each point in the compressed handwriting record.
3. "length" represents the number of elements in the handwriting records, as described previously.
4. "new_res" is the handwriting record resolution after compression has been applied.
5. "old_res" is the handwriting record resolution before compression has been applied.
6. "new" is an array index which points to the next open position in either "x[]", "y[]", or "stylus[]" after the last point in the new, compressed handwriting record. For example, "x[new−1]" is the last x-coordinate in the handwriting record after compression. "new" is also equal to the length of the compressed handwriting record.
7. "start" is an array index used during compression.
8. "midpoint" is an array index used during compression.
9. "stop" is an array index used during compression.
10. "n" is an array index used during compressing.

Figure 3A:
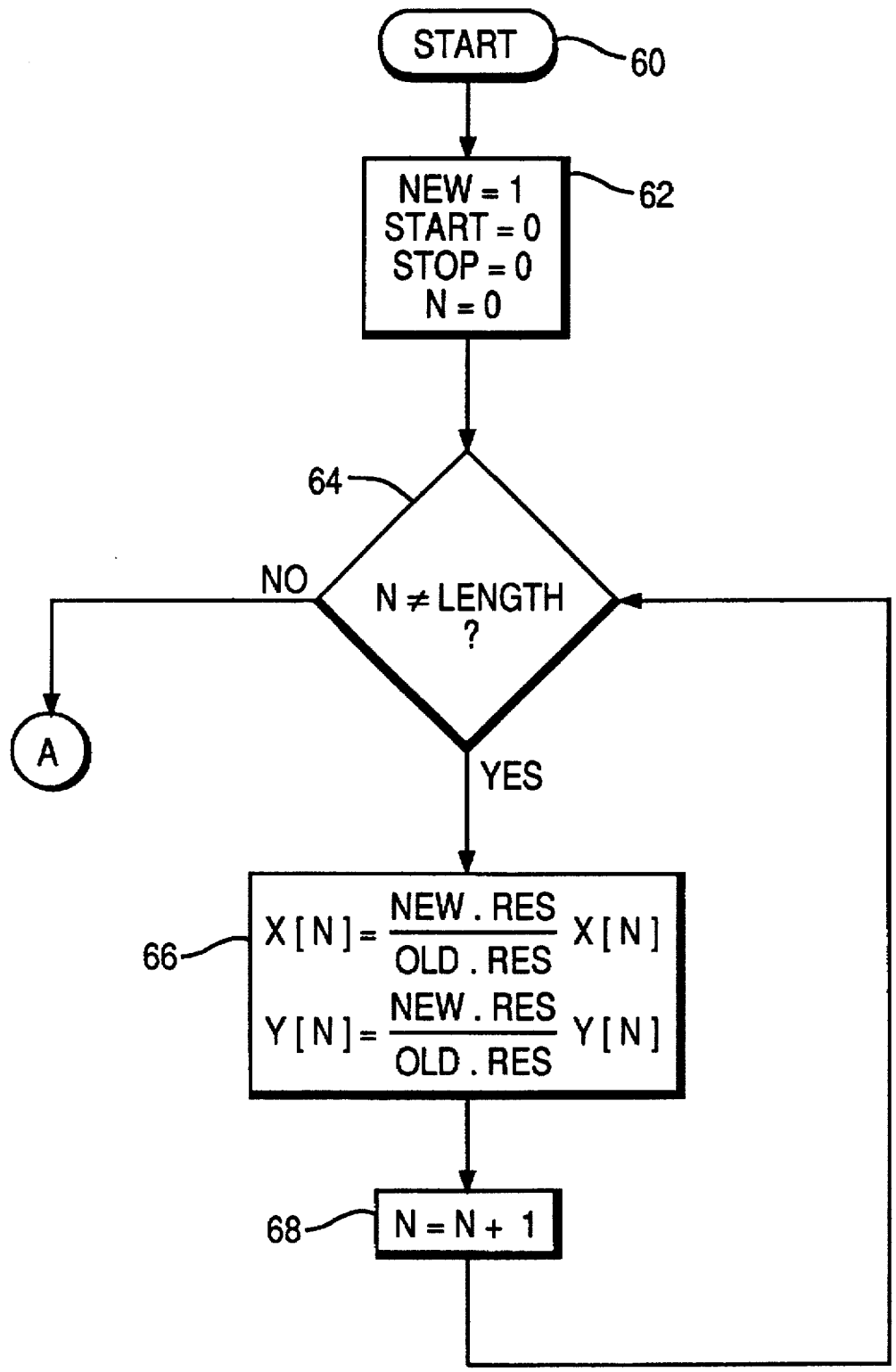
FIGS. 3A through 3E are a flowchart for a digital computer program which reads, compresses and stores signature data.

Referring to FIG. 3A, the procedure starts at block 60. In block 62, the different variables used later on in the procedure are initialized: "new" is set to 1, "start" is set to 0, "stop" is set to 0, and "n" is set to 0.

In block 64, an inquiry is made as to whether "n" is not equal to "length". If so, the procedure continues to block 66, where the coordinates "x[n]" and "y[n]" are scaled to the new resolution, "new_res". Scaling is accomplished by multiplying each coordinate in turn by the scalar ("new_res"/"old_res"). Following this, "n" is incremented by one in block 68, and the procedure branches back to block 64.

If "n" is not equal to "length", the procedure continues to block 70 (FIG. 3B), where an inquiry is made as to whether "length" is less than or equal to 2. If so, there is no use trying to compress this handwriting record, as it is already as small as it could possibly be. In this case, the procedure continues to block 72, where "new" is set equal to "length". The procedure then terminates at block 74.

If length is not less than or equal to 2, the procedure continues to block 76, where "stop" is incremented by one. Following this, an inquiry is made at block 78 to determine whether "stylus[stop]" is equal to 1. If not, then the presently processed point is a continuation of a previous stroke. In that case, the procedure continues to block 80 (FIG. 3C), where "midpoint" is set equal to "start" plus one. An inquiry is then made at decision point 82 to determine whether "midpoint" is not equal to "stop". If so, the procedure continues to decision point 84, where an inquiry is made as to whether the point (x[midpoint], y[midpoint]) can be discarded. Otherwise, the procedure branches to block 94 (FIG. 3E) via node 93.

Figure 3B:
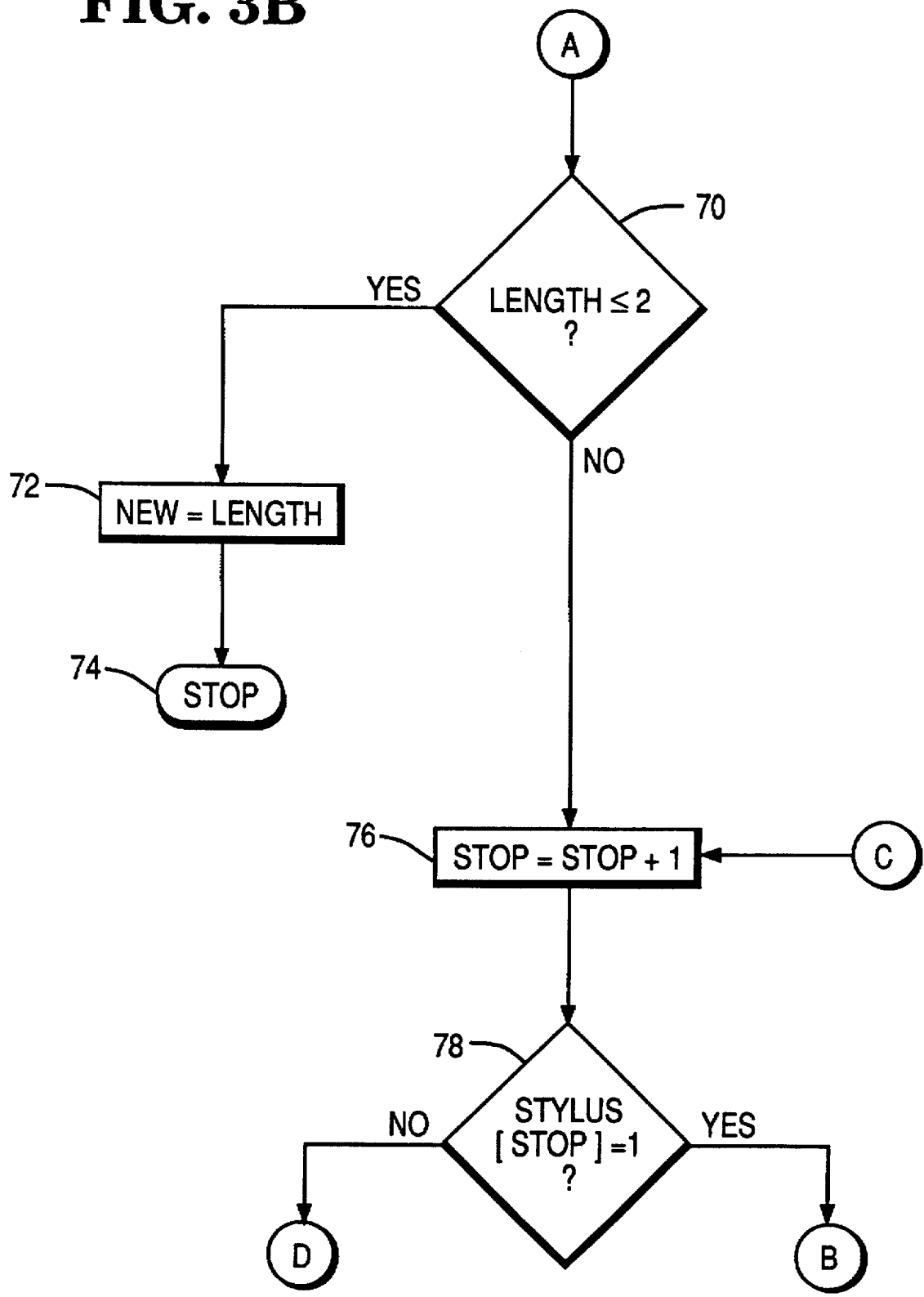
Figure 3C:
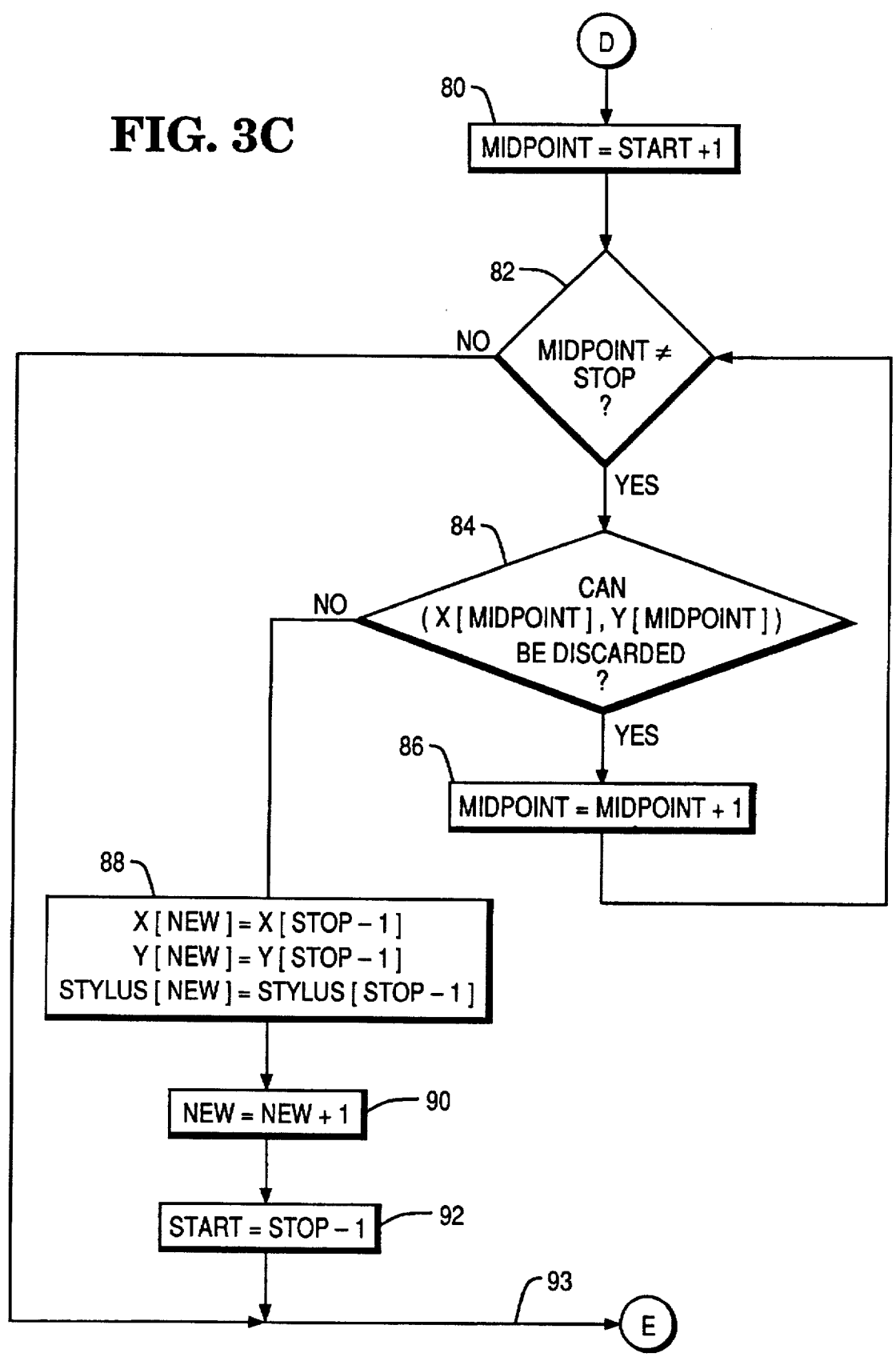
Figure 3D:
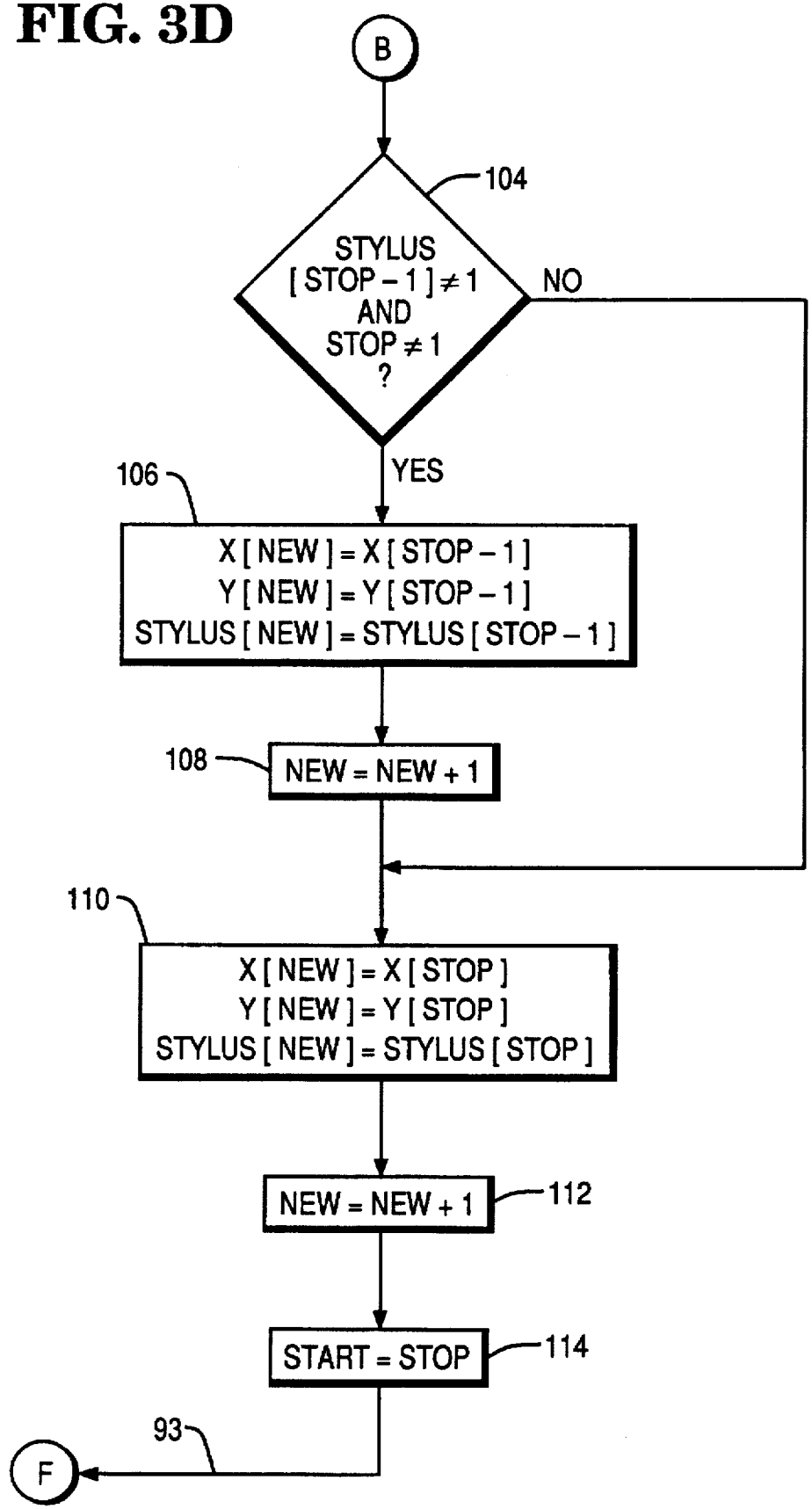
Figure 3E:
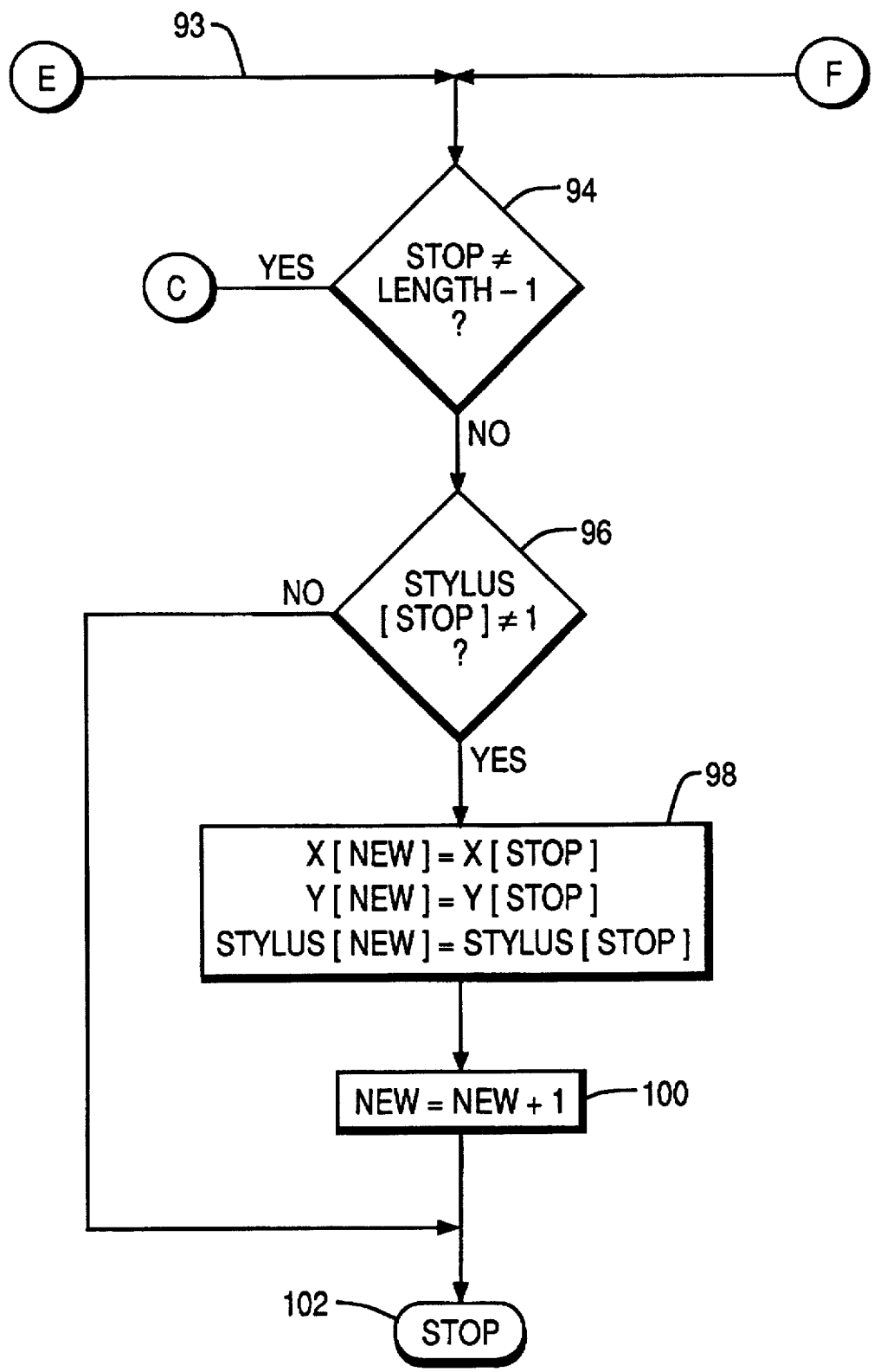

Returning to block 84 of FIG. 3C, if the point (x[midpoint],y[midpoint]) can be discarded, execution continues to block 86, where "midpoint" is incremented by one, and the procedure returns to block 82. Otherwise, the procedure continues to block 88.

In block 88, the point indexed by "stop" minus 1 is stored in the compressed handwriting record by setting "x[new]" equal to "x[stop−1]", "y[new]" equal to "y[stop−1]", and "stylus[new]" equal to "stylus[stop −1]".

Following block 88, "new" is incremented by one in block 90 and start is set equal to stop−1 in block 92. The procedure then branches to block 94 (FIG. 3E) via node 93.

In block 94, an inquiry is made to determine whether stop is not equal to length minus 1. If so, execution continues branches back to block 76 (FIG. 3B). If not, the entire handwriting record has been processed, and the procedure continues to block 96 where an inquiry is made to determine whether stylus[stop] does not equal one. If not, the procedure ends in block 102. Otherwise, the point indexed by "stop" is added to the end of the compressed handwriting record in block 98 by setting "x[new]" equal to "x[stop]", setting "y[new]" equal to "y[stop]", and setting "stylus [new]" equal to "stylus[stop]". New is then incremented by one in block 100 and the procedure ends in block 102.

Returning to decision point 78, if "stylus[stop]" is equal to one, the procedure continues instead to block 104 (FIG. 3D), where an inquiry is made as to whether "stylus[stop−1]" is not equal to one and "stop" is not equal to one. If either condition is false, execution continues to block 110. Otherwise, execution continues to block 106, where the point indexed by "stop" minus one is stored in the compressed handwriting record by setting "x[new]" equal to "x[stop−1]", "y[new]" equal to "y[stop−1]", and "stylus [new]" equal to "stylus[stop−1]". "new" is then incremented by one in block 108. Following this, the point indexed by "stop" is stored in the compressed handwriting record by setting "x[new]" equal to "x[stop]", setting 'y[new]" equal to "y[stop]", and setting stylus[new]" equal to "stylus[stop]" in block 110. "new" is then incremented by one in block 112. Following this, the procedure continues to block 114, where "start" is set equal to "stop". The procedure then continues to block 94 (FIG. 3E) via node 93.

It is not necessary that the guide lines used in accordance with this invention be straight lines. It is also practical to determine the redundancy of a midpoint based upon its location relative to a curved guide line extending in the strokewise direction. Such a curved guide line may be generated, for instance, by computing the coefficients of a polynomial function passing through the stop point, the start point and one or more previous start/stop points. It could also be generated through use of a non-rectangular coordinate system. For example, a curved guide line could be constructed in a circular coordinate system as an arc of constant radius.

It is also apparent that a guide line may be projected beyond a stop point and used for checking the redundancy of midpoints which are beyond the stop point.

Furthermore, it is possible to generate the handwritten signature with the aid of devices other than a stylus-activated digitizer. For example, a mouse or a puck activated digitizer could be used.

Figure 4:
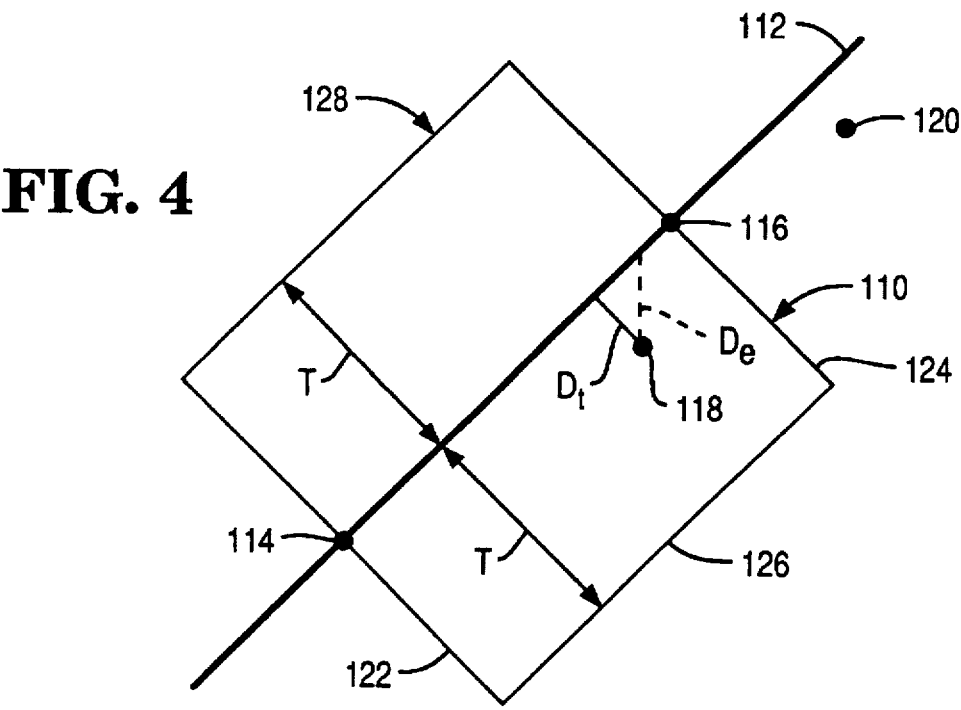
FIG. 4 is a schematic illustration of a linear fit criterion for discarding midpoint coordinate data.

Turning now to FIG. 4, a rectangle 110 is shown about guide line 112 from a signature entered into digitizer 20. Rectangle 110 includes sides 122–128. Points 114 and 116 represent start and stop points of line 112. Points 118 and 120 represent points sampled between points 114 and 116. Under the method of the present invention, point 118 is discarded, while point 120 is not discarded. The width of the rectangle is represented here as twice a threshold distance T, which in practice is chosen to preserve a high quality printed image.

Referring now to FIGS. 5A through 5D, a first embodiment of the present invention begins at start 130. In block 132, an inquiry is made to determine whether guide line 112 is horizontal. Computer 12 compares y[start] with y[stop] to see if they are equal. If the condition is true, execution begins at block 144 where an inquiry is made to determine whether x[midpoint] is within the interval between x[start] and x[stop]. If it is not within that interval, then the midpoint is discarded and execution transfers to the end of the procedure at block 168. If the inquiry in block 144 is true, then the method proceeds to block 146 where the absolute value of y[midpoint]−y[start] is compared to the threshold vale T. If the condition in block 146 is true, then the midpoint is discarded in block 148 an the method terminates in block 168. If the inquiry in block 146 is false, then the internal point is not discarded and the method terminates in block 168.

If the inquiry in block 132 is false, then an inquiry is made in block 134 to determine whether guide line 112 is vertical. Computer 12 compares x[start] with x[stop] to see if they are equal. If the condition is true, then execution begins in block 150 where an inquiry is made to determine whether y[midpoint] is within the interval between y[start] and y[stop]. If it is not, then the midpoint is discarded and the method terminates in block 168. If the inquiry in block 150 is true, then the absolute value of x[midpoint]−x[start] is compared to the threshold value T in block 152. If the result is not greater than threshold value t, then the midpoint is discarded in block 154 and the method terminates in block 168. If the inquiry in block 152 is false, then the midpoint is not discarded and the method ends in block 168.

If the inquiry in block 134 is false, then guide line 112 is neither vertical nor horizontal and the method proceeds to block 136, where an inquiry is made to determine whether y[start] is less than y[stop]. If the inquiry is true, then the start and stop points are swapped in block 138 and the method proceeds to block 140. If the inquiry is false, then the method proceeds directly to block 140. In block 140, the resulting start point is translated to the origin. In block 142, the same translation is applied to the remaining points.

In blocks 155 and 156, the parallel test is performed. The parallel test is a heuristic and determines whether the absolute value of De is less than or equal to the threshold value T. In block 155, distance De is calculated based on the following equations:

$$slope=(y[start]-y[stop])/(x[start]-x[stop])$$

$$intercept=y[start]-slope*[start]$$

$$y[calculated]=slope*x[midpoint]+intercept$$

In block 156, the comparison is made between distance De and threshold value T. If the inquiry in block 156 is false, then the point is discarded and the method terminates in block 168. If the inquiry is true, then the parallel test is passed and the perpendicular test is begun in block 158.

The perpendicular test determines whether a midpoint lies between lines 122 and 124. Thus, in block 158, x[midpoint] is inserted into the equation for line 122. The equation for this line is determined using the start point and a slope equal to the negative reciprocal of line 112. In block 160, and inquiry is made to determine whether y[midpoint] is greater than or equal to y[calculated]. If the inquiry is not true, then the point is discarded and the method terminates in block 168. If the condition is true, then the method proceeds to block 162.

In block 162, x[midpoint] is inserted into the equation for line 124. The equation for this line is determined using the start point and a slope equal to the negative reciprocal of line 112. In block 164, an inquiry is made to determine whether y[midpoint] is less than or equal to y[calculated]. If the condition is true, then the midpoint is not and the method terminates in block 168. If the condition is true, then the midpoint is discarded in block 166 and the method terminates in block 168.

Advantageously, under the method of FIGS. 5A through 5D, points like point 120 are retained.

Turning now to FIGS. 6A through 6D, a second embodiment of the method of the present invention is shown beginning with START block 170. Blocks 172 through 194 are identical to blocks 132 through 154 of FIGS. 5A and 5B.

Figure 5A:
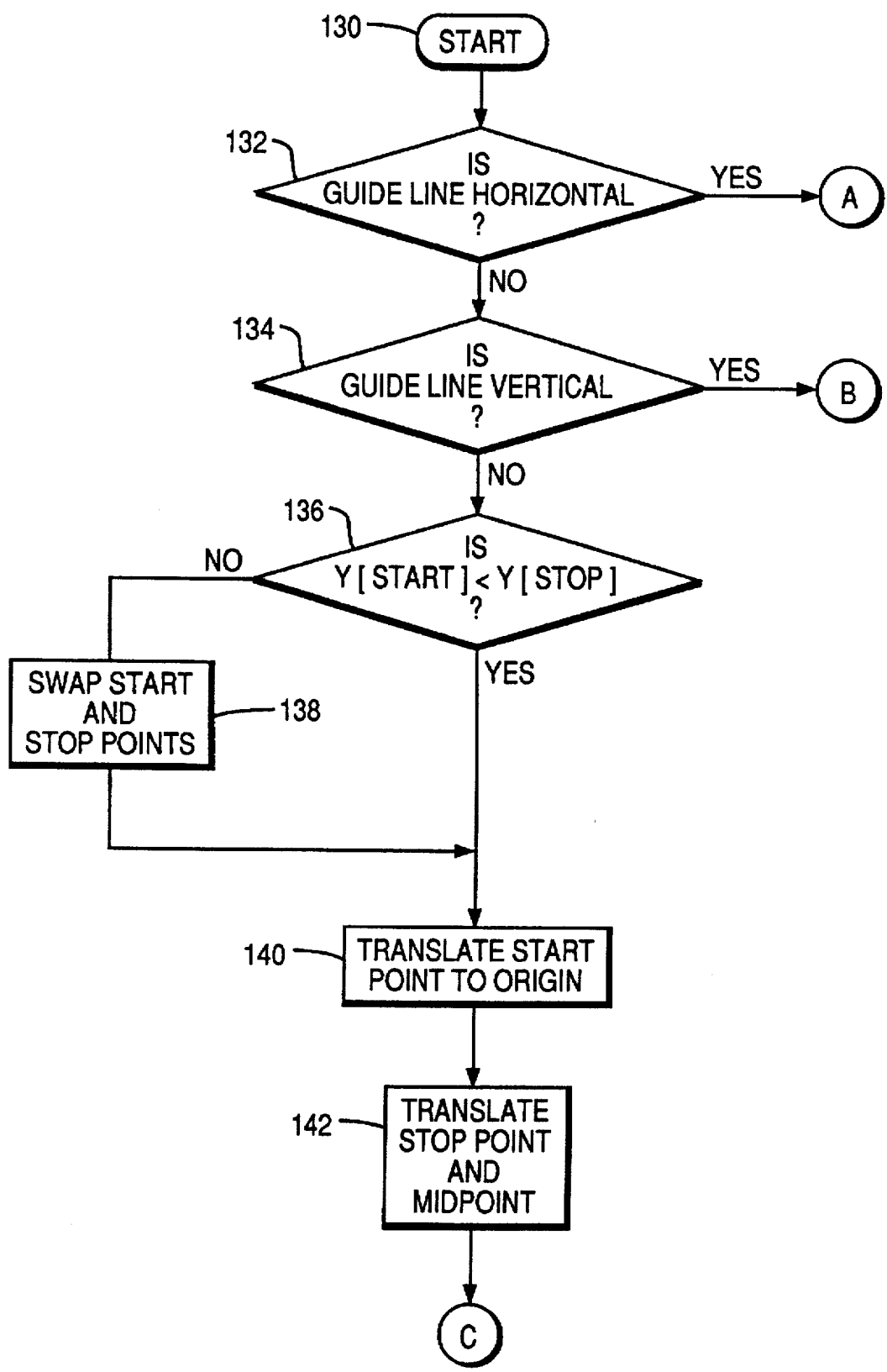
FIGS. 5A through 5D are flowcharts for a first embodiment of a method for discarding coordinate data.
Figure 5B:
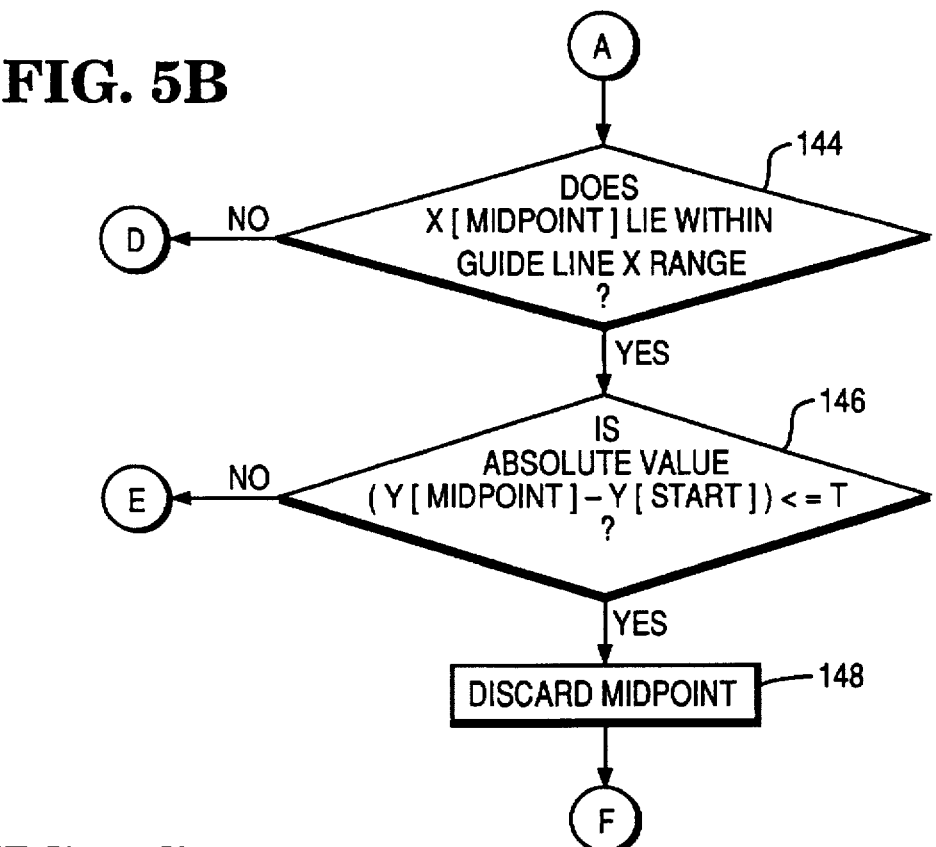
Figure 5C:
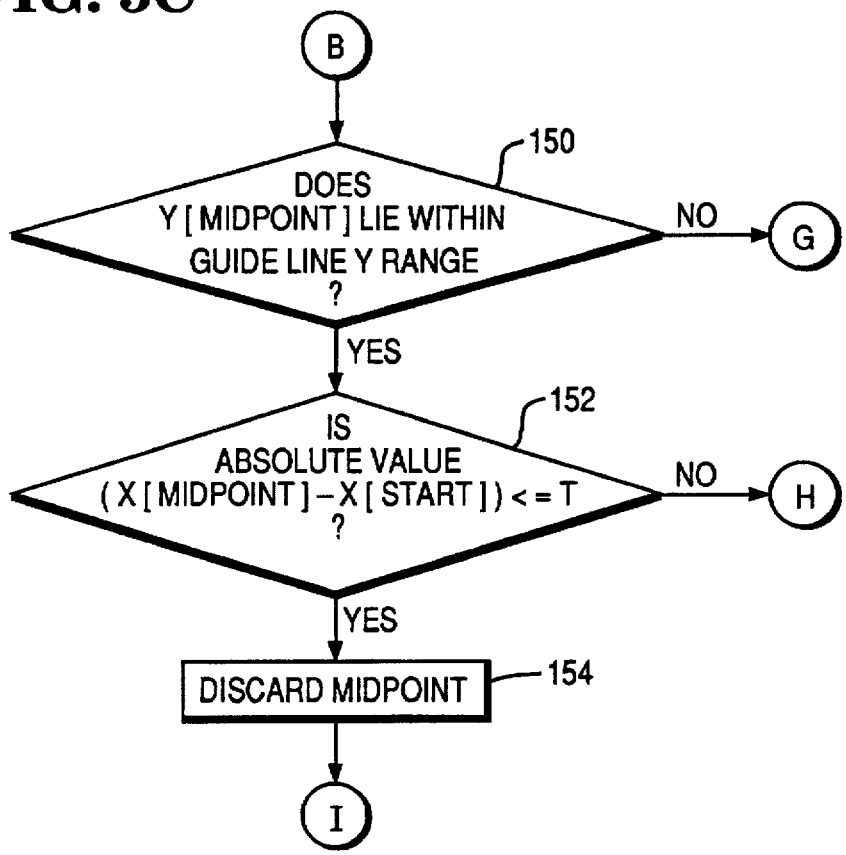
Figure 5D:
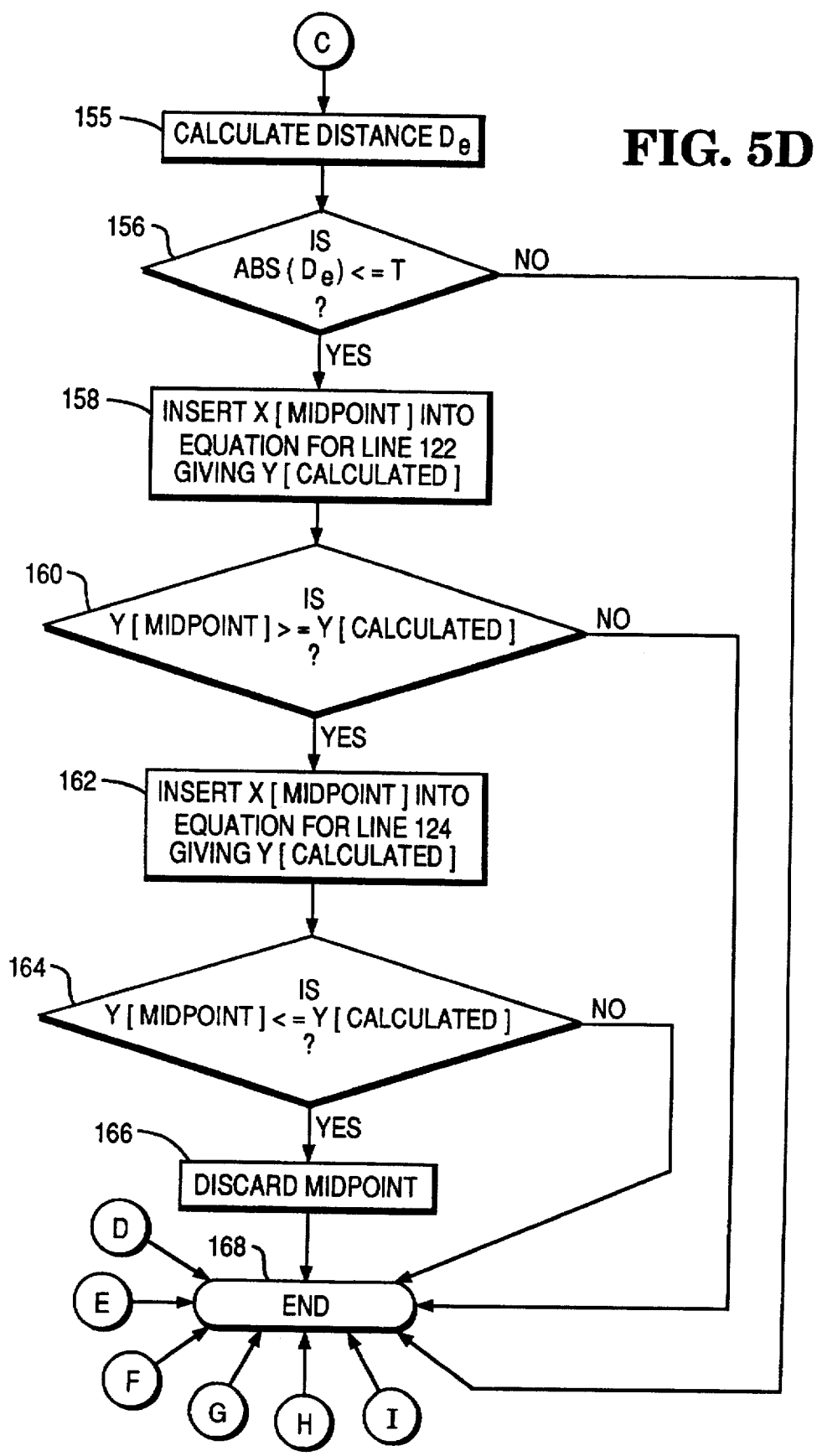
Figure 6A:
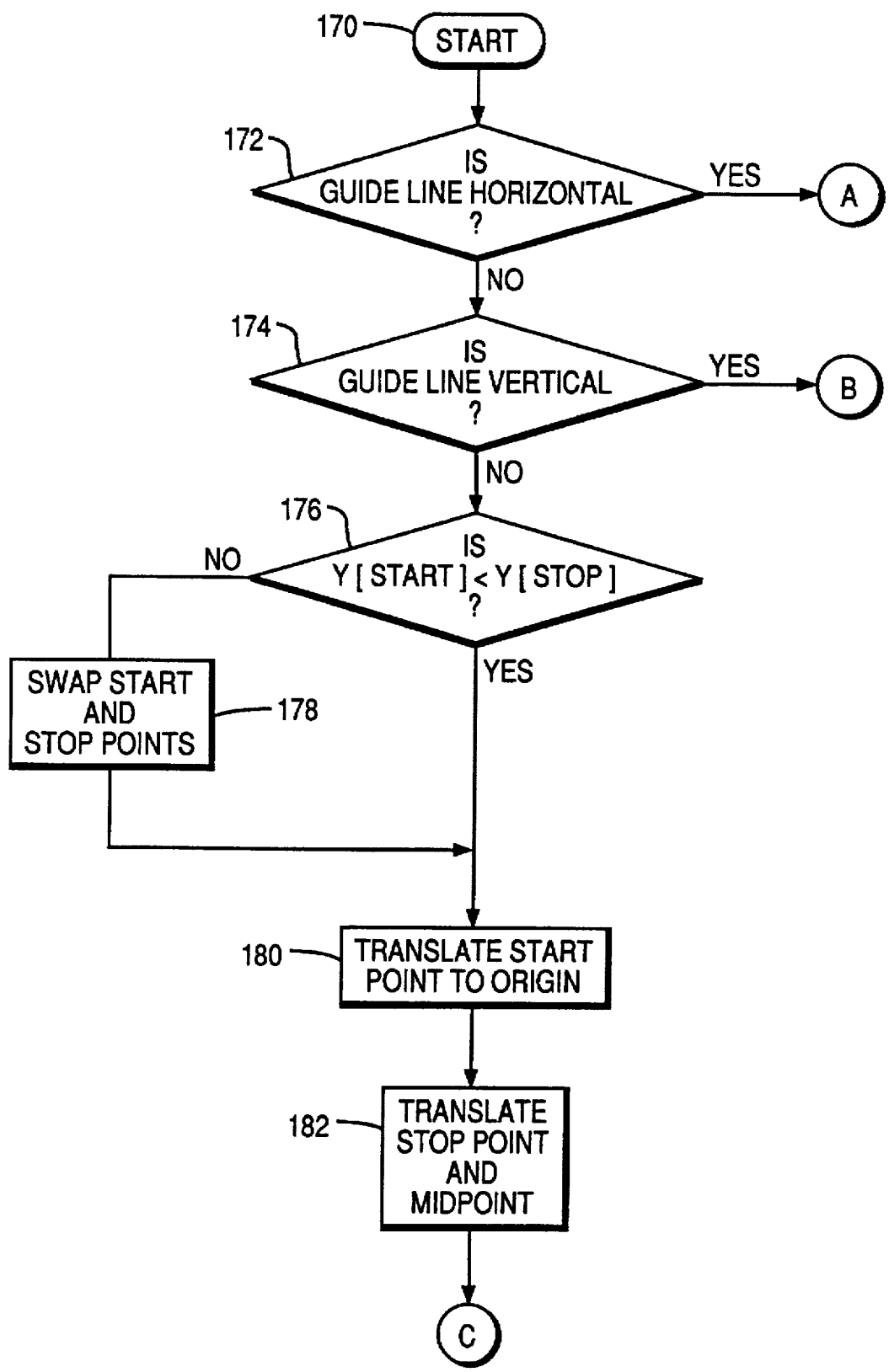
FIG. 6A through 6D are flowcharts for a second embodiment of a method for discarding coordinate data.
Figure 6B:
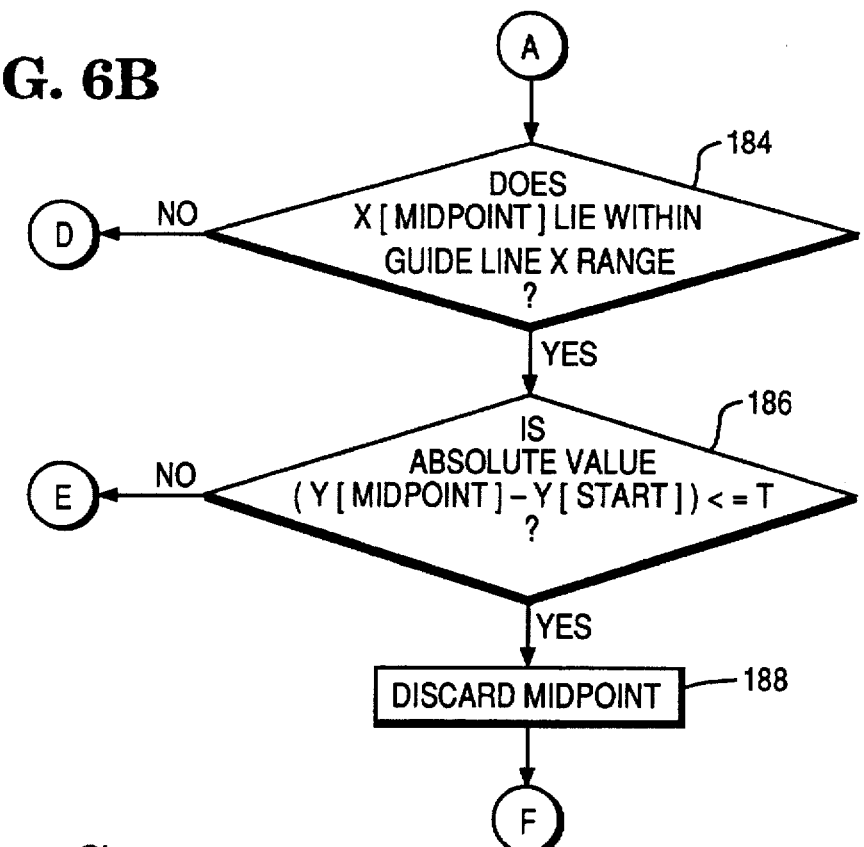
Figure 6C:
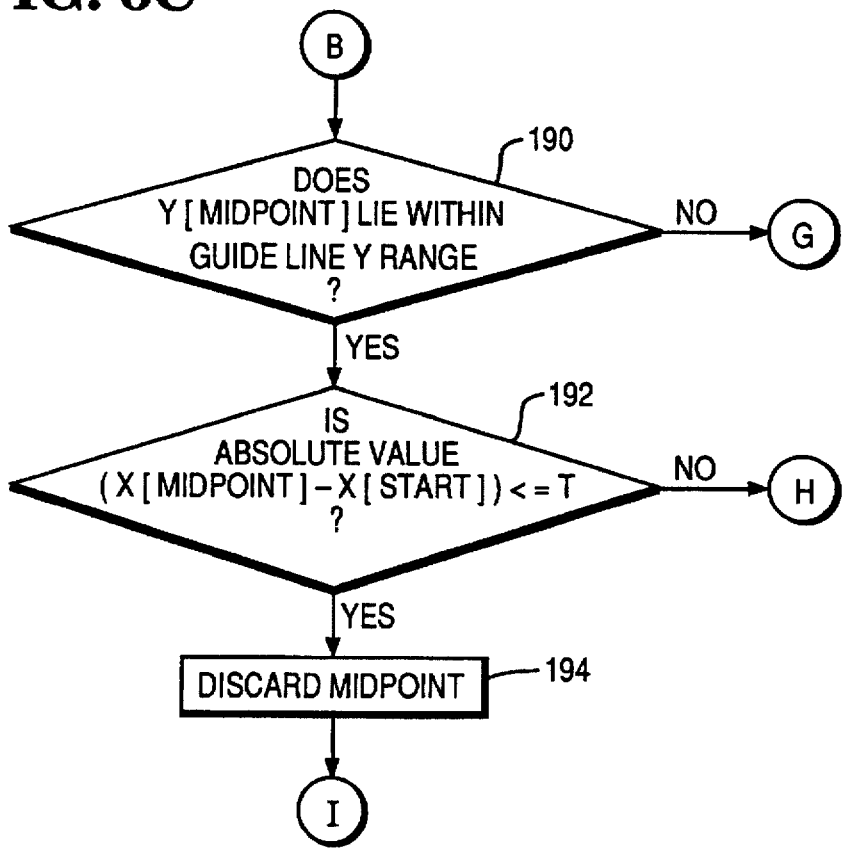
Figure 6D:
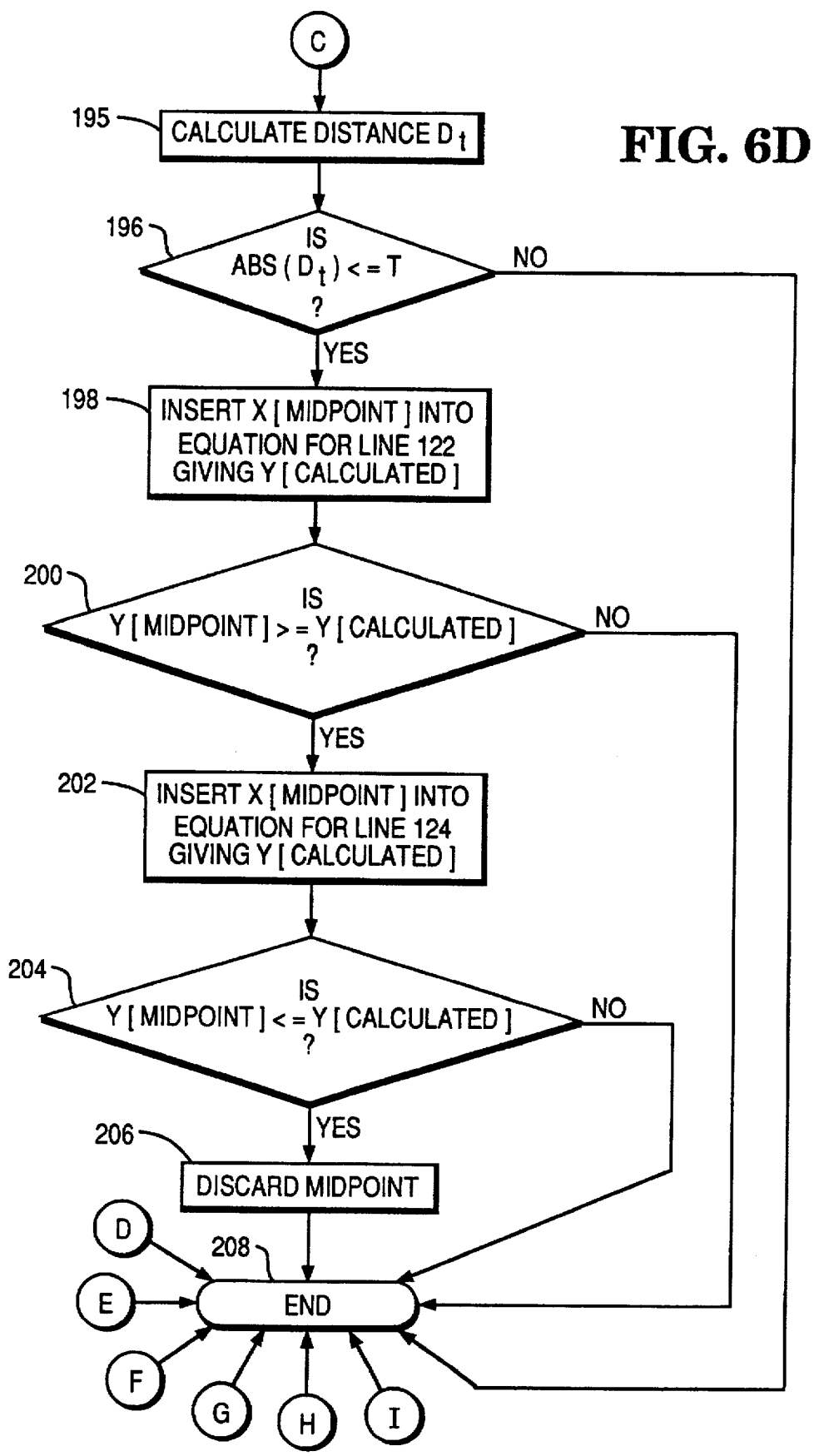

Thus, in block 195 of FIG. 5C, the true distance Dt is obtained using the formula:

$$Dt=(Ax+By+C)/sqrt(A^2+B^2)$$

where Ax+By+C=0 is the equation of guide line 112 and where the x and y values pertain to the values for the midpoint.

In block 196, an inquiry is made to determine whether the true distance is less than or equal than the threshold distance T. If so, then method continues in blocks 198 through 208 with the perpendicular test as in FIG. 5C, blocks 160 through 168. If the perpendicular test is not satisfied, then the midpoint is discarded and the method terminates in block 208.

Advantageously, under the method of FIGS. 6A through 6D, points like point 120 are retained. However, since distance Dt is always less than distance De, more points can potentially qualify for elimination for a given threshold value T.

Figure 7:
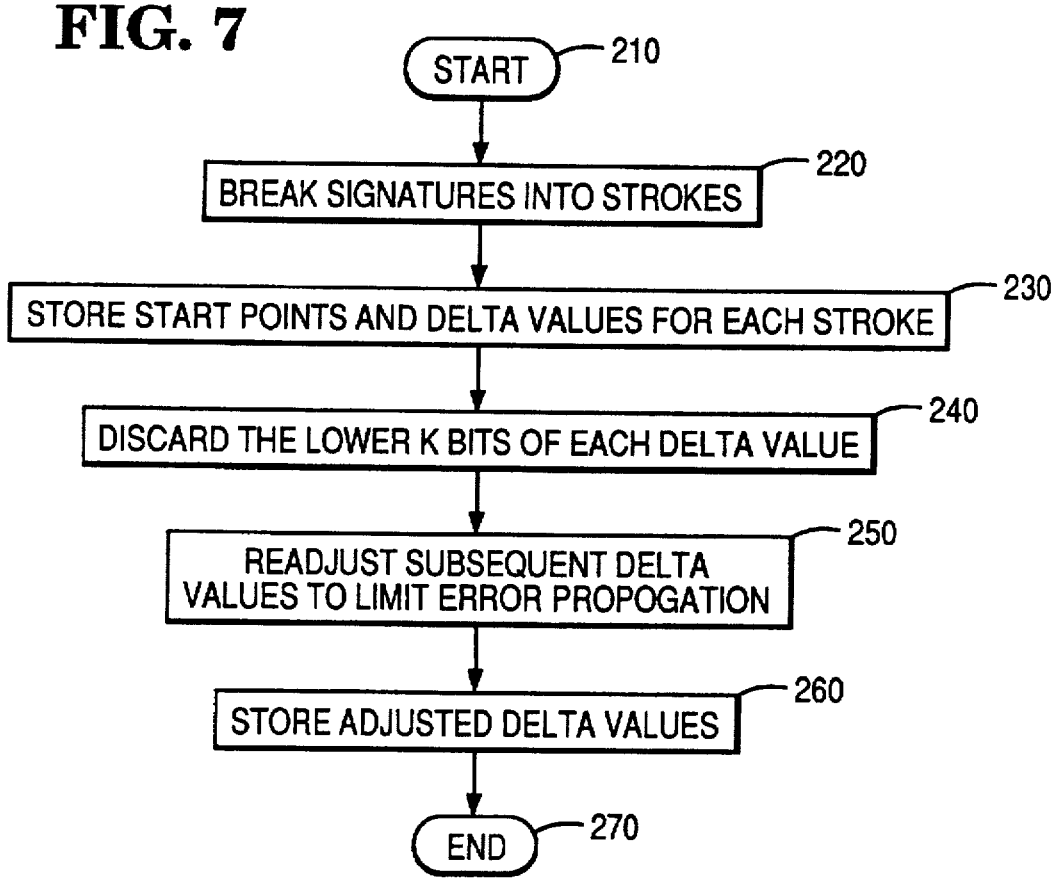
FIG. 7 is a flowchart for storing coordinate data.

Turning now to FIG. 7, a method of storing compressed data is shown beginning with START 210. Such data may represent coordinate values which have been scaled to a predetermined resolution as disclosed above, typically 512 dots per inch). Typically, though, the media used to reconstruct hardcopy images of the signature data allow for a smaller resolution (about 75 to 300 dots per inch). The storing method of the present invention takes advantage of this fact to save storage space by permitting a relatively small error to exist in the stored coordinates, since that error is virtually eliminated in the hardcopy image due to the scaling reduction.

In block 220, the signature is broken down into strokes consisting of start and stop points as discussed above in the capture phase.

The strokes are stored in terms of the coordinates of the start point (x[start], y[start]) and delta x and delta y values, instead of start and stop points. Each stroke includes a plurality of stroke points. The reason for storing delta x and y values is that they take up less storage space. Typically, coordinate values can be stored in ten bits bytes, while delta values require only eight bits without any loss of accuracy. Then, subsequent stroke points may be computed using a set of delta values, each delta value being applied to a previously computed stroke point.

Thus, in block 230, the start points for each stroke are stored.

Before the delta values are stored, the number of bits is reduced by shifting the delta value k bits to the right in block 240. When later retrieving the shifted delta values, each shifted delta value is shifted k bits to the left and then half of 2^(k−1) is added or subtracted depending upon the sign of the delta value.

In block 250, error propagation is limited to 2^(k−1) by readjusting delta values subsequent to the first pair of delta values for a given stroke. If the delta value is positive, then the net error is −mod(delta, 2^k)+2^(k−1). Therefore, the subsequent delta value is decremented by this amount. If the delta value is negative, then the net error is mod(−delta, 2^k)−2^(k−1). As before, to compensate for this error the subsequent delta value is decremented by this net error. Error propagation is further reduced in both cases when the printing scaling reduction is later done.

In block 260, the adjusted delta values are stored and the method ends in block 270.

Under the storing method of the present invention, satisfactory error reduction has occurred for k=3 (five bits out of eight).

Although the invention has been described with particular reference to certain preferred embodiments thereof, variations and modifications of the present invention can be effected within the spirit and scope of the following claims.

What is claimed is:

1. A method of recording a handwritten signature entered into a digitizer comprising the steps of:

providing a handwriting capture device including the digitizer and a hand-held stylus for capturing the handwritten signature;

sensing the location of a series of signature points progressively traversed by the stylus during strokewise movement thereof on the surface of the digitizer;

generating a stream of digital position data from the analog position data from the digitizer indicating the location of the signature points on the surface of the digitizer for use by a digital computer;

generating a series of strokewise oriented guide lines from the position data, each guideline having two end points, each end point being defined by first and second coordinate values, and the guide lines being arranged end-to-end;

determining first and second delta values for each guide line, the first delta value being the difference between the first coordinate values of each end point and the second delta value being determined by the difference between the second coordinate values of each end point, each delta value being represented by a predetermined number of bits less than the number of bits representing the end points;

discarding a predetermined number of lower bits from each delta value;

readjusting each delta value to limit error propagation; and storing one of the end points and a corresponding readjusted delta value for each guide line.

* * * * *

UNITED STATES PATENT AND TRADEMARK OFFICE
CERTIFICATE OF CORRECTION

PATENT NO. : 5,699,445
DATED : December 16, 1997
INVENTOR(S) : Samuel J. Wagner et al.

It is certified that error appears in the above-indentified patent and that said Letters Patent is hereby corrected as shown below:

Title Page, after [73] Assignee: delete "Paul W. Martin" and substitute --NCR Corporation--.

Signed and Sealed this

Eighteenth Day of April, 2000

Attest:

Q. TODD DICKINSON

*Attesting Officer*  *Director of Patents and Trademarks*

UNITED STATES PATENT AND TRADEMARK OFFICE
CERTIFICATE OF CORRECTION

PATENT NO. : 5,699,445
DATED : December 16, 1997
INVENTOR(S) : Samuel J. Wagner et al.

It is certified that error appears in the above-identified patent and that said Letters Patent is hereby corrected as shown below:

<u>Title page,</u>
Item [73], Assignee, delete "Paul W. Martin" and substitute -- NCR Corporation --.

Signed and Sealed this

Twentieth Day of August, 2002

Attest:

JAMES E. ROGAN
*Attesting Officer*  *Director of the United States Patent and Trademark Office*